Nov. 19, 1929.　　C. LE G. FORTESCUE　　1,736,434
PHASE SEQUENCE RELAY
Filed July 31, 1924　　2 Sheets-Sheet 2

Fig.2.

WITNESSES:

INVENTOR
Charles LeG. Fortescue
BY
ATTORNEY

Patented Nov. 19, 1929

1,736,434

UNITED STATES PATENT OFFICE

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA

PHASE-SEQUENCE RELAY

Application filed July 31, 1924. Serial No. 729,244.

My invention relates to sectionalizing switches and more particularly to those controlled by phase-sequence relays.

One object of my invention is to provide a distribution system with sectionalizing switches that shall respond to phase-sequence currents.

Another object of my invention is to provide a distribution system with sectionalizing switches that shall respond to zero, positive and negative phase-sequence currents.

It is also an object of my invention to provide a distribution system with sectionalizing switches that shall operate in accordance with their proximity to a grounded fault as indicated by zero phase-sequence current.

Another object of my invention is to provide a system of protection for sectionalized ring-type distribution systems.

A further object of my invention is to provide a simple and inexpensive protective system for isolating faulty sections of a ring-type distribution system.

In a ring system, energy is supplied at one or more points to a system containing several sub-stations connected in sequence in a closed ring. If a faulty condition should occur in any connecting section between sub-stations, that section could be isolated and energy supplied to the terminal sub-stations through the remaining portions of the system.

In each sub-station, the entering line or section is connected to the station bus through circuit interrupters. These may be operated to disconnect one line or the other as it becomes faulty and the normal line will supply energy to the station bus.

In order to selectively control the interrupters in accordance with the condition of the associated line, I provide a directional selective relay system to be energized by electrical conditions in the bus to determine which line may be faulty. By determining the direction of the fault currents selective control of the interrupters is effected.

In the accompanying drawings,

Fig. 2 is a diagrammatic view of apparatus and circuits embodying another form of my invention.

Figure 1:
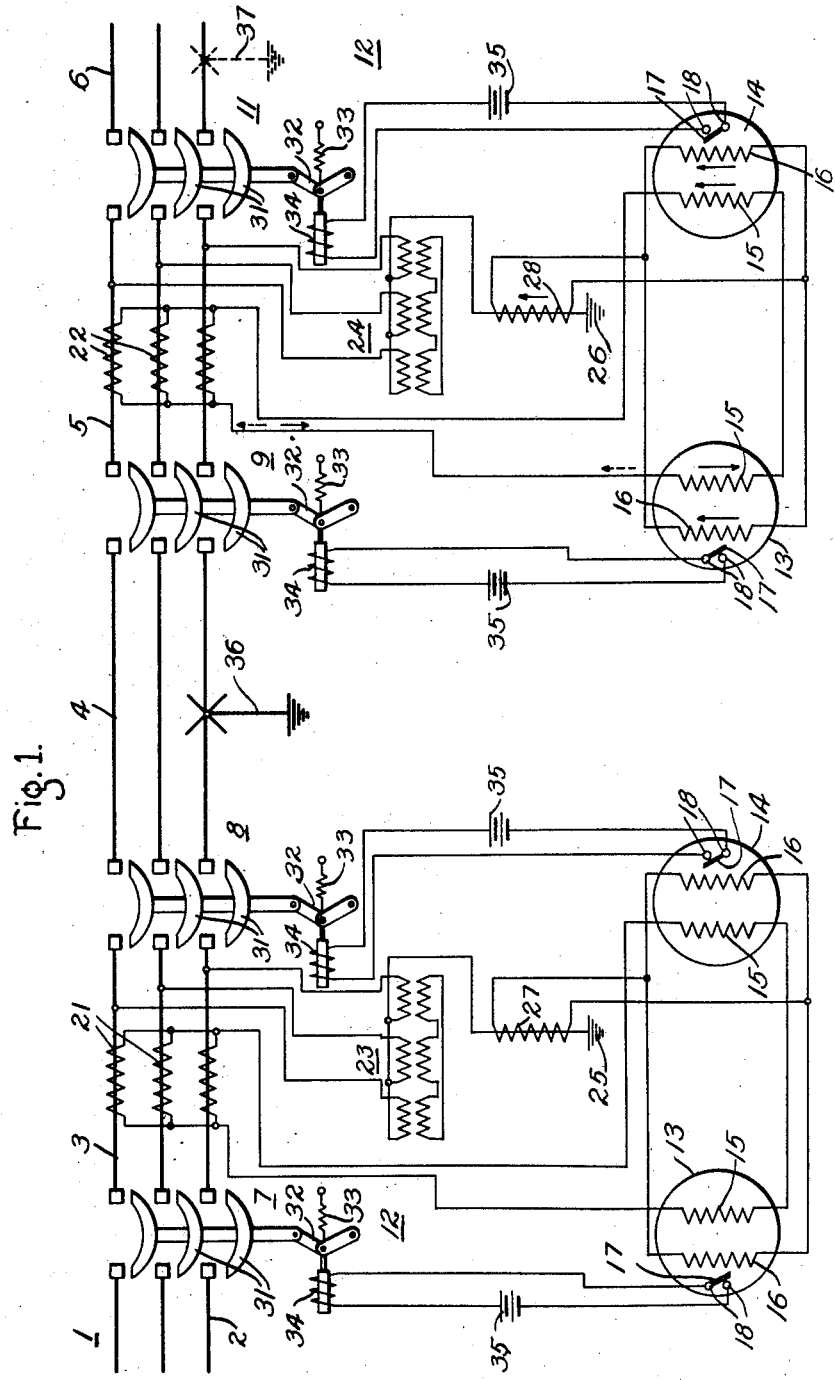
Figure 1 is a diagrammatic view of apparatus and circuits embodying my invention.

My invention comprises, in general, a polyphase distribution system 1 comprising a plurality of line sections 2, 4 and 6 and bus sections 3 and 5 that are connected by a plurality of circuit interrupters 7, 8, 9 and 11, respectively. A source of power is so connected to the system 1, which may be of the ring type, that under certain conditions power may be fed to the sections from either the right-hand or left-hand end. Each of the circuit interrupters is operated in accordance with an associated relay system 12 responsive to the occurrence of zero-phase-sequence currents caused by a grounded conductor on the system.

Each of the relay systems 12 comprises a pair of watt relays 13 and 14, having an inverse time element in their operation. Each of the relays 13 and 14 comprises a pair of windings 15 and 16 and a bridging member 17 co-operating with a pair of stationary contacts 18. The windings 15 and 16 may be arranged to operate cumulatively or differentially with relation to the bridging member 17, in order to secure a directional function in its movement. The mechanical and electrical details of such relays constitute no part of the present invention except in so far as is necessary to complete the combinations herein described.

Suitable star-connected current transformer banks 21 and 22 may be connected to the bus sections 3 and 5 of the transmission line 1. The neutral points of these transformer banks are connected in circuit with the windings 15 of the associated relays 13 and 14. Current therefore traverses the windings 15 of the relays 13 and 14 only when a grounded condition occurs in the transmission system 1.

Associated with each of the transformer banks 21 and 22 are star-connected potential transformer banks 23 and 24, the neutral points of which are connected to ground as at 25 and 26, respectively. The secondary windings of transformers 23 and 24 are delta-connected in order to prevent shifting of the neutral points of the primary windings.

Current transformers 27 and 28 are in circuit with the grounded conductors 25 and 26, respectively. The windings 16 of the associated relays 13 and 14 are connected in parallel circuit with the transformers 27 and 28, and the energization of the coils 16 is always in proportion to the zero phase-sequence voltage. Accordingly, each of the relays 13 and 14 includes a winding 15 that is energized from one of the transformer banks 21 or 22 in accordance with the zero phase-sequence current and a coil 16 that is always energized in accordance with the zero phase-sequence voltage.

Each of the circuit interrupters 7, 8, 9 and 11, comprises a plurality of bridging members 31, a toggle mechanism 32, a closing spring 33 and a trip or opening coil 34. Each of the coils 34 is in circuit with a source of electromotive force 35 and the stationary contact members 18 of the associated relay 13 or 14.

In line section 4 of the system, there is shown, as at 36, a fault to ground and in line section 6, there is shown in dotted lines, as at 37, another fault to ground.

During normal operating conditions of the distributing system 1, the circuit interrupters 7, 8, 9 and 11 are closed. The coils 15 and 16 are normally inactive, as the zero phase-sequence current and voltage are zero, with the result that the relays 13 and 14 remain in their open positions.

Assuming a ground to occur at 36, the distribution system 1 experiences a point of discontinuity of the relationship between the positive, negative and zero components at that point. The result of this disturbance is that the zero phase-sequence component of voltage of the system is at a maximum at the ground 36, which condition gradually disappears in proportion to the remoteness therefrom of the several elements of the system 1. Because of this condition, the relay system 12 nearest to the fault 36 is energized in the greatest degree and the relay system 12 at the most remote point is the least energized.

By reason of the appearance of the zero phase-sequence currents in the system 1, the transformer banks 21 and 22 are unbalanced and a current traverses the conductor connecting the neutral points thereof including the connected windings 15 of the relays 13 and 14. It is obvious that the amount of unbalance in the transformer banks 21 and 22, as measured by the currents in the connected windings 15, varies inversely to the severity of the fault.

As shown by the solid line arrows associated with section 5, the direction of this current is such that the currents in the windings 15 and 16 of the relay 13 oppose each other and the bridging member 17 engages the stationary contact members 18, whereupon the circuit interrupter 9 is opened, thereby protecting the sections 5 and 6 from further disturbance due to the fault 36. In this discussion, it is assumed that the relays 13 and 14 are differentially wound. If the circuit interrupter 9 has been operated as heretofore described, the circuit interrupter 8 is operated by the action of the relay 14 associated therewith.

It is to be observed that if the fault 36 occurs midway between the circuit interrupters 8 and 9 that both of these interrupters will operate substantially simultaneously. If the fault occurs at an unequal distance between them, both of the circuit interrupters 8 and 9 will operate at times that are directly proportional to their distance from the fault. In the event that the circuit interrupter 9 opens in advance of the circuit interrupter 8, the negative phase-sequence currents from the fault 36 are entirely diverted to the transformer bank 21 with the result that the opening of the circuit interrupter 8 is expedited.

In section 6 of the system 1, a fault 37 is shown in dotted lines. The relay system 12 connected to the bus section 5 shows, in dotted lines, the direction of current flow between the neutral points of the transformer bank 22 when this fault occurs. Since the direction of current through the transformer 28 does not change in direction in accordance with the position of the grounded fault, the direction of current in the winding 16, remains constant. However, as shown by the dotted arrows, the direction of current in the windings 15 does change by reason of a change in location of the grounded fault from one side of the transformer bank 22 to the other with a resultant change in the direction of current in the windings 15 of the relays 13 and 14. The current traversing the transformer 28 is always in phase with the current in the fault 36 or 37. Under these conditions, it is obvious that the effects of the windings 15 and 16 of the relay 13 are cumulative while the effects of the windings 15 and 16 in the relay 14 are differential, thereby causing the operation of the relay 14 and the opening of the circuit interrupter 11.

By reason of the time element and directional features of each of my relay systems 12, the effects of a fault occurring in an unprotected section are transmitted to the several relays 13 and 14 in accordance with their position and in accordance with the direction of the fault occurrence, whereby the relay nearest to the fault is operated first and the relay next in distance is operated thereafter, whereupon the affected section of the system 1 is effectively disconnected.

Referring to Fig. 2, I have shown a sectionalized distribution system that is responsive to the positive, negative and zero sequence components of both the voltage and the current quantities in the distribution system 1. The current transformer bank 42 is connected to the bus section 5 between the two line sections 4 and 6 and supplies electrical energy to impedance networks 43 and 44, the latter being similar in characteristics and structure. An impedance network 45 is also connected to the delta-connected secondary of the voltage transformer bank 24. Each of the impedance networks 43 and 44 comprises a pair of equal reactors 46, 48 and a pair of equal resistors 47, 49, each having an impedance equal to that of one of the reactors that are arranged in a manner similar to those of the arms of a Wheatstone bridge. The impedance network 45 likewise comprises a pair of equal reactors 51, 53, and a pair of equal resistors 52 and 54. The relative values of the reactors and resistors in the impedance networks may be determined with mathematical precision in accordance with the principles set forth in my paper delivered before the American Institute of Electrical Engineers on June 28, 1918, and in Letters Patent No. 1,571,224, issued February 2, 1926, to C. T. Allcutt. These values are such that under either balanced or unbalanced conditions in the circuit 1 current traverses the relays attached thereto in accordance with the magnitude of the phase-sequence currents of the circuit.

The impedance networks 43, 44 and 45 have terminals 55, 56 and 57, respectively, that may be considered as the positive source of the negative phase-sequence currents originated in each of the impedance networks while terminals 58, 59 and 61, respectively, may be considered the positive sources of positive phase-sequence currents in each of the impedance networks upon the occurrence of a fault in the system 1.

A plurality of watt element relays 62, 63, 64, 65, 66 and 67 are each provided with a pair of normally differentially disposed windings 68—69, 71—72, 73—74, 75—76, 77—78 and 79—81, respectively, and a contactor 82. While the pairs of windings in each of the relays 62 to 67, inclusive, are shown and described as differentially disposed, it is obvious that these windings may be made cumulative if desired without affecting the principles of my invention.

The terminals 55 and 58 of the impedance network 43 are connected through the windings 68 and 72, respectively, to a common terminal 83, that constitutes one neutral connection of the transformer bank 42. Similarly, the terminals 56 and 59, of the impedance network 44, are connected through the windings 79 and 76, respectively, to a terminal 84 that constitutes the other neutral point for the transformer bank 42. By reason of these connections, the windings 79 and 68 are continuously energized by negative phase-sequence currents and the windings 72 and 76 are continuously energized by positive phase-sequence currents when there is an unbalanced condition in the circuit 1.

Conductors 85 and 86 connect the neutral points 83 and 84 through the transformer bank 42 while a conductor 87 and windings 74 and 77 connect these points externally of the transformer bank 42 thereby constituting a neutral connection. Normally no current traverses the windings 74 and 77 by reason of the balanced condition in the transformer bank 42 and impedance networks 43 and 44. However, upon the occurrence of a ground in the system, such as at 36 or 37, current will traverse these windings.

The transformer 28, that is similar to the transformer 28 shown in Fig. 1, supplies current to the windings 73 and 78 connected in parallel circuit. Since no current traverses the transformer 28 and the ground connection 26 until a fault occurs on the system 1, such as 36 or 37, the windings 73 and 78 are normally de-energized as are the windings 74 and 77 as has heretofore been explained. Accordingly, the relays 64 and 66 are energized only upon the occurrence of a ground on the system, such ground being indicated by the occurrence of zero phase-sequence currents.

Windings 71 and 75 of the relays 63 and 65 are connected in parallel circuit between the terminals 61 and 88. The terminal 88 is connected by a conductor 89 to the secondary winding of the transformer bank 24. Likewise, the windings 69 and 81 of the relays 62 and 67 are connected in parallel circuit between the terminal 57 of the impedance network 45 and the terminal 88.

The impedance network 45 being energized by the transformer bank 24, energizes the windings 69, 71, 75 and 81 upon the occurrence of a fault but in opposition to the directional current in the windings 68, 72, 76 and 79, respectively, whereby the contactors 82 of the relays 62, 63, 65 and 67 remain in their open positions.

The direction of the positive and negative phase-sequence currents generated in the voltage impedance network 45 is always constant regardless of the direction of the fault 36 or 37, as the case may be. However, the direction of the currents traversing the transformer bank 42 and consequently, the impedance networks 43 and 44 are subjected to reversals of direction in accordance with whether the fault occurs on the system 1 to the right of or to the left of the transformer bank 42. Similarly, the current traversing the conductor 87 is subject to reversal, the solid line arrow indicating the direction of current in the conductor 87 when the fault is at 36 and the dotted line arrow indicating the direction of the current in the conductor 87 when the fault is at 37.

Accordingly, each of the relays 62 to 67, inclusive has a winding that is energized by a current proportional to the sequence components of current of the system 1 in which the current direction remains constant. Also each of the relays 62 to 67, inclusive, has a winding that is energized in accordance with the sequence components of voltage of the system 1, the direction of current therethrough being subject to reversal. Accordingly, the contactor 82 of any one of the relays 62 to 67, inclusive, is moved to its circuit closing position when the direction of current in the two windings of the relay is cumulative in producing the closing movement thereof. As has been heretofore stated, the relays are normally designed so that they are differentially wound under normal operating conditions, athough they may be cumulatively wound during normal operating conditions and moved to the circuit closing position under a differential action if desired.

Assuming a grounded fault to occur at 36 in section 4 of the transmission line, the voltage transformer 28 will be energized and the windings 73 and 78 of the relays 64 and 66, respectively, will be energized. As is shown by the solid arrows, there is a current traversing the conductor 87 such that the windings 73 and 74 of the relay 64 assist each other in closing the contactor 82 whereupon the circuit interrupter 9 is moved to its circuit opening position and the section 4 is isolated from the section 5. At the same time, the direction of current in the windings 77 and 78 of the relay 66 are opposed and the relay 66 remains inoperative. If a ground occurs at 37 in section 6, the direction of current in the conductor 87 is opposite to that just described and the relay 66 operates to open the circuit interrupter 11 and isolate the section 6. Since a grounded fault normally produces only zero phase-sequence currents, the currents delivered by the impedance networks 43 and 44 are not affected by simple grounds.

However, should the fault 36 or 37 be an unbalance between phases or a ground accompanied by an unbalance between phases, the impedance networks 43 and 44 are subjected to changed conditions and the negative phase-sequence currents generated therein are given a direction corresponding to whether or not the fault was to the right of or the left of the current transformer bank 42. Accordingly, the relays 62 or 67 will be energized to trip the circuit interrupter 9 or 11 as the case may be.

Upon the occurrence of an overload condition to the right or the left of the transformer bank 42, the positive sequence component of the system is increased and the relay 63 or 65 is energized to interrupt the system 1.

In this form of my invention, the distribution system is protected from undesirable disturbances that produce predetermined positive, negative and zero phase-sequence current while in the modification shown in Fig. 1, the distribution system 1 is protected from ground current only as indicated by zero phase-sequence currents. It will thus be seen that I have provided a system for sectionalizing distribution systems that operates in accordance with the relative distances to a fault and in accordance with the directions of that fault therefrom.

I do not wish to be restricted to the specific circuit connections or arrangements of parts herein set forth, as various modifications thereof may be made without departing from the spirit and scope of my invention. I desire, therefore, that only such limitations shall be imposed as are indicated in the appended claims.

I claim as my invention:

1. In a system of distribution containing several sub-stations provided with buses to which incoming and outgoing distribution lines are connected through circuit-interrupters, the combination with the interrupters, of a plurality of current transformers in the bus conductors, a plurality of potential transformers connected to the bus conductors, means connected to each set of transfomers for segregating a phase component indicative of a faulty condition in the system and relays connected to said means to be energized by such components to determine the direction of the fault and to operate the corresponding interrupter.

2. In a system of distribution containing several substations provided with buses to which incoming and outgoing distribution lines are connected through circuit-interrupters, the combination with the interrupters, of means associated with said busses for segregating phase components indicative of a faulty condition in the system, relays for controlling the operation of said interrupters, and means for energizing said relays by said components and in accordance with the direction of the fault.

3. In a system of distribution containing several sub-stations provided with busses to which incoming and outgoing distribution lines are connected through circuit-interrupters, and combination with the interrupters, of means associated with said busses for segregating phase components indicative of a faulty condition in the system and time-element directional relays connected to said means to be energized by said components to control the interrupters according to the location of the faulty condition.

4. In a system of distribution containing several sub-stations provided with busses to which incoming and outgoing distribution lines are connected through circuit-interrupters, the combination with the interrupters, of means associated with said busses for segregating phase components indicative of a faulty condition in the system, time-element relay means for selectively controlling the operation of said interrupters, and means for energizing said relay means by said components.

5. In a system of distribution containing several sub-stations provided with busses to which incoming and outgoing distribution lines are connected through circuit-interrupters, the combination with the interrupters, of inverse-time-element relays adjusted to control the operation of the interrupters according to the location of a faulty condition, and means for energizing said relays by phase components segregated from the system, said components being indicative of faulty conditions.

6. In a sectionalized distribution system and circuit interrupters therefor, the combination with the interrupters, of means associated with said system for segregating phase components indicative of a faulty condition in the system, and relay means energized thereby for selectively controlling the operation of said interrupters in accordance with negative and zero phase components of said system.

7. In a system of distribution containing several sub-stations provided with busses to which incoming and outgoing distribution lines are connected through circuit-interrupters, the combination with the interrupters, of means associated with said busses for segregating the positive, negative and zero phase components indicative of a faulty condition in the system and time-element directional relays connected to said means to be energized by said components to control the interrupters, the selective operation of which is dependent on the negative and zero phase components of the system.

8. The combination in a sectionalized distribution system and circuit-interrupters associated therewith, of means for segregating the positive, negative and zero phase components indicative of a faulty condition in the system, and time-element relay means having a selectivity in operation in accordance with the negative and zero phase components in the system.

9. The combination in a sectionalized distribution system and circuit interrupters therefor, of means for segregating the positive, negative and zero phase components indicative of a faulty condition in the system, and time-element relay means energized by said components to selectively operate the said relays independently of the phase or phases affected by a fault.

10. In a sectionalized distribution system having circuit-interrupters associated therewith, the combination of means for segregating zero phase components indicative of a faulty condition in the system, relays for controlling the operation of said interrupters, and means for energizing said relays by said components and in accordance with the direction of the fault.

11. In a sectionalized distribution system and circuit-interrupters therefor, the combination with the interrupters, of means for segregating the zero phase components indicative of a faulty condition in the system, time-element directional impedance relays for controlling the operation of said interrupters, and means for energizing said relays by said components.

In testimony whereof, I have hereunto subscribed my name this 25th day of July 1924.

CHARLES LE G. FORTESCUE.